United States Patent
Ishika et al.

[11] Patent Number: 5,781,519
[45] Date of Patent: Jul. 14, 1998

[54] OPTICAL HEAD APPARATUS FOR READING DIFFERENT TYPES OF RECORDING MEDIUMS

[75] Inventors: So Ishika, Yokohama; Yuichi Nakamura, Minato-ku, both of Japan

[73] Assignee: Kabushiki Kaisha Toshiba, Kawasaki, Japan

[21] Appl. No.: 795,862

[22] Filed: Feb. 6, 1997

[30] Foreign Application Priority Data

Feb. 7, 1996 [JP] Japan .................. 8-021289

[51] Int. Cl.$^6$ .................................................. G11B 7/00
[52] U.S. Cl. .................................... 369/58; 369/112
[58] Field of Search .................... 369/112, 116, 369/44.37, 124, 58, 44.23, 44.24

[56] References Cited

U.S. PATENT DOCUMENTS

| | | | |
|---|---|---|---|
| 5,235,581 | 8/1993 | Miyagawa et al. | 369/58 |
| 5,272,667 | 12/1993 | Yamada et al. | 369/13 |
| 5,398,226 | 3/1995 | Edwards | 369/112 |
| 5,408,453 | 4/1995 | Holtslag et al. | 369/112 |
| 5,440,533 | 8/1995 | Fujimaka et al. | 369/112 |
| 5,633,853 | 5/1997 | Kim et al. | 369/112 |

*Primary Examiner*—Nabil Hindi
*Attorney, Agent, or Firm*—Cushman Darby & Cushman IP Group of Pillsbury Madison & Sutro LLP

[57] ABSTRACT

An optical head apparatus is disclosed, that comprises a first optical system having a first objective lens (20) and a low power output laser device (24) and a second optical system having a second objective lens (30) and a high power output laser device (37). The focal length of the first objective lens (20) is different from the focal length of the second objective lens (30). One of these optical systems is selected corresponding to the type of an optical disc for use. The energy use efficiency of laser beam of the optical head apparatus with the above-described structure is higher than that of an apparatus using a multi-focus lens. Thus, without need to use a light source having a high light intensity, data of various optical discs can be accurately reproduced. In addition, data can be more accurately and rapidly recorded on various optical discs with different record densities.

6 Claims, 3 Drawing Sheets

OPTICAL HEAD APPARATUS FOR READING DIFFERENT TYPES OF RECORDING MEDIUMS

BACKGROUND OF THE INVENTION

1. Field of the Invention

The present invention relates to an optical disc apparatus for radiating a laser beam on a record surface of an optical head so as to record data to the optical disc or to read data therefrom.

2. Description of the Related Art

An optical disc unit has an optical head apparatus including an objective lens and an optical detector. In the optical disc unit, an optical beam is radiated on the record surface of the optical disc through the optical head apparatus so as to reproduce data recorded on the optical disc and record data thereto.

In recent years, as well as conventional reproduction only discs, various types of optical discs (corresponding to various standards) have been commercially available. For example, recordable/erasable discs, high density discs, and multi-layered discs have been available. Thus, needs for optical disc units that can handle a plurality of types of discs are becoming strong. To accomplish optical disc units that can handle a plurality of types of optical discs with different record densities, an optical head apparatus that has a multi-focus lens with a plurality of focal lengths has been used.

However, in the optical head apparatus with the multi-focus lens, because a laser beam radiated to an optical disc is dispersed to a plurality of focal points, the energy efficiency of the unit is poor. When data is recorded on the optical disc, the optical disc is heated by the laser beam, thereby changing the reflectance of the record layer thereof. In this case, the time for which cumulative energy of the laser beam reaches a predetermined amount depends on the energy use efficiency of the laser beam. Thus, the data record speed of the optical head apparatus with the multi-focus lens is lower than that of an apparatus with a single-focus lens. In addition, with the multi-focus lens, when data is reproduced from an optical disc, since the light intensity of the laser beam is insufficient, the data is not accurately read. To solve this problem, it is possible to increase the power of the laser device so as to increase the energy of the laser beam. However, when a laser device with a large output power is used, the size of the optical head apparatus increases and the cost thereof rises.

Moreover, in the case of a multi-layered optical disc, since a laser beam is reflected on each of the record layers, a record layer to be focus-locked cannot be determined.

SUMMARY OF THE INVENTION

An object of the present invention is to provide an optical head apparatus for accurately reproducing data of various types of optical discs that have different record densities.

Another object of the present invention is to provide an optical head apparatus for more accurately and rapidly recording data on various types of optical discs that have different record densities.

To accomplish such objects, an optical head apparatus according to the present invention comprises a first optical means having a first light source and a first lens means, the first lens means having a first focal length for which light radiated by the first light source is focused on a record surface of a record medium, a second optical means having a second light source and a second lens means, the second lens means having a second focal length for which light radiated by the second light source is focused on the record surface of the record medium, the second focal length being different from the first focal length, and a selecting means for selecting the first optical means or the second optical means.

According to the present invention, since one of two optical means that have lens means having different focal lengths is selected corresponding to the type of the record medium for use, the energy use efficiency of light (laser beam) is higher than that of a multi-focus lens. Thus, without need to use a light source having a high light intensity, data of various types of optical discs having different record densities can be accurately reproduced. In addition, data can be more accurately and rapidly recorded on various types of optical discs having different record densities.

An optical head apparatus according to the present invention comprises a first optical means having a first light source and a first lens means, the first light source generating light with a first intensity, the first lens means having a first focal length for which light radiated by the first light source is focused on a record surface of a record medium, a second optical means having a second light source and a second lens means, the second light source generating light with a second intensity, the second intensity being different from the first intensity, the second lens means having a second focal length for which light radiated by the second light source is focused on the record surface of the record medium, the second focal length being different from the first focal length, and a selecting means for selecting the first optical means or the second optical means.

An optical head apparatus according to the present invention comprises a first optical means having a first light source, a first lens means, and a first photoelectric converting means, the first light source generating light with a first intensity, the first lens means having a first focal length for which light radiated by the first light source is focused on a record surface of a record medium, the first photoelectric converting means detecting reflected light from the record surface of the record medium and obtaining an electric signal corresponding to the reflected light, a second optical means having a second light source, a second lens means, and a second photoelectric converting means, the second light source generating light with a second intensity, the second intensity being different from the first intensity, the second lens means having a second focal length for which light radiated by the second light source is focused on the record surface of the record medium, the second focal length being different from the first focal length, the second photoelectric converting means detecting reflected light from the record surface of the record medium and obtaining an electric signal corresponding to the reflected light, and a selecting means for selecting the first optical means or the second optical means.

According to the present invention, since one of two optical means that have a light source having different light intensity and lens means having different focal lengths is selected corresponding to the type of the record medium for use, the energy use efficiency of light (laser beam) is higher than that of a multi-focus lens. Thus, without need to use a light source having a high light intensity, data of various types of optical discs having different record densities can be accurately reproduced. In addition, data can be more accurately and rapidly recorded on various types of optical discs having different record densities.

These and other objects, features and advantages of the present invention will become more apparent in light of the following detailed description of a best mode embodiment thereof, as illustrated in the accompanying drawings.

DESCRIPTION OF THE PREFERRED EMBODIMENT

Next, an embodiment of the present invention will be described.

Figure 1:
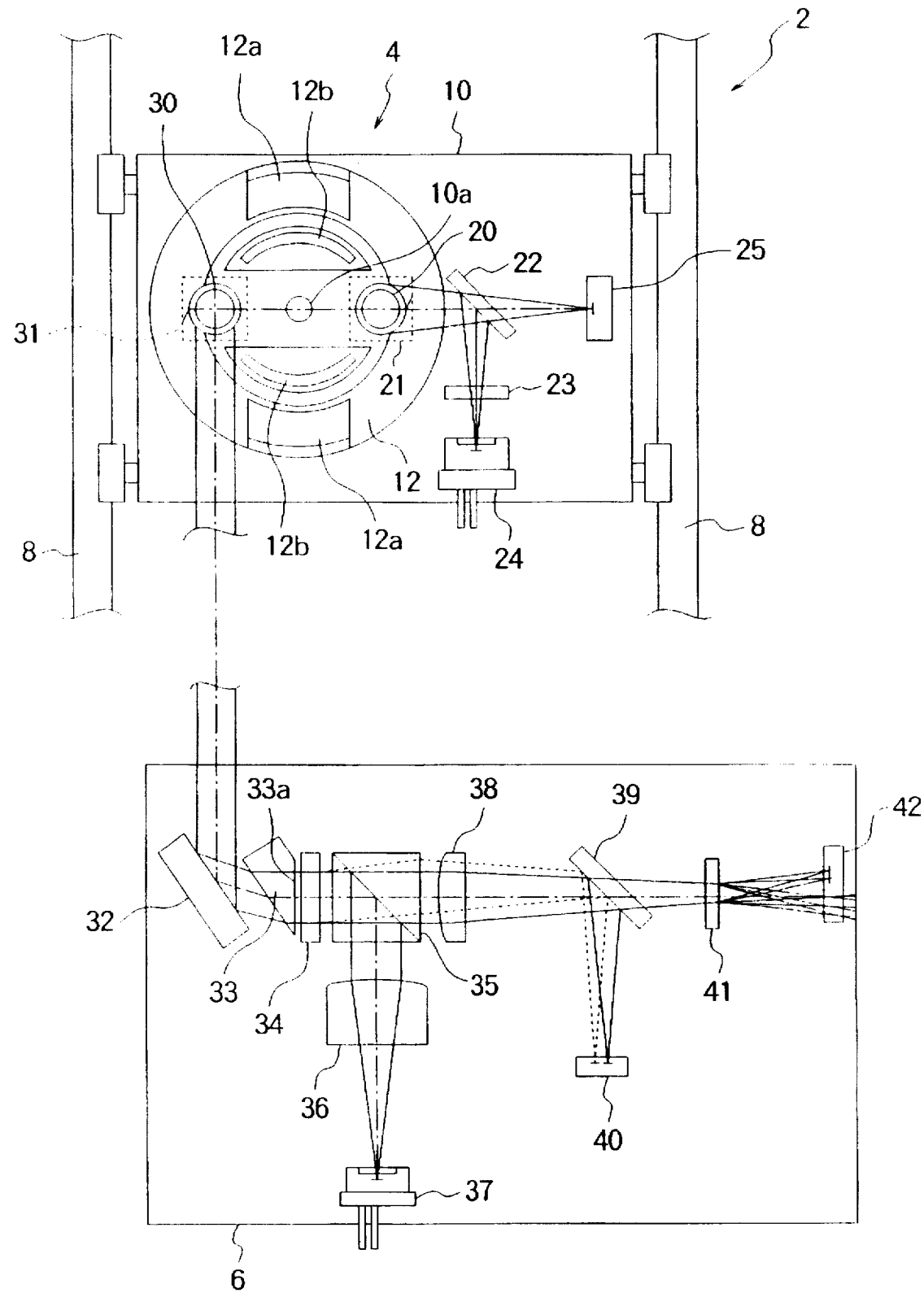
FIG. 1 is a schematic diagram showing the structure of an optical head apparatus according to an embodiment of the present invention.

As shown in FIG. 1, an optical head apparatus 2 is composed of a movable optical system 4 and a fixed optical system 6. The movable optical system 4 is disposed in a carriage body 10 in such a manner that the optical system 4 is movable in parallel with the record surface of an optical disc (not shown) and in the radial direction thereof along two guide rails 8. The fixed optical system 6 is secured in such a manner that it does not interfere with the motion of the movable optical system 4.

The carriage body 10 has a lens holder 12. The lens holder 12 holds a first objective lens 20 and a second objective lens 30 that have different focal lengths. For example, the first objective lens 20 is an objective lens that has a predetermined focal length corresponding to normal optical discs with a thickness of 1.2 mm. On the other hand, the second objective lens 30 is an objective lens that has a predetermined focal length corresponding to high density discs with a thickness of 0.6 mm or multi-layered discs of which discs with a thickness of 0.6 mm are layered.

The lens holder 12 is supported by a center shaft 10a disposed in the carriage body 10 so that the lens holder 12 is movable in the direction perpendicular to the record surface of the disc. The first objective lens 20 and the second objective lens 30 are oppositely disposed with respect to the center shaft 10a. A pair of magnets 12b and 12b are secured to the lens holder 12. The magnets 12b and 12b form a magnetic circuit along with a pair of driving coils 12a and 12a disposed in the carriage body 10 to move the lens holder 12.

The first objective lens 20 is optically connected to a raising mirror 21, a beam splitter 22, a hologram plate 23, a low power output laser device 24, and an optical detector 25 that are disposed in the carriage body 10.

The hologram plate 23 shapes a laser beam generated by the low power output laser device 24 in a predetermined sectional shape, and guides the laser beam to the beam splitter 22.

The beam splitter 22 reflects the laser beam that passes through the hologram plate 23, guides the laser beam to the raising mirror 21, and radiates the laser beam reflected off of the optical disc to the optical detector 25.

The raising mirror 21 is disposed at the rear of the first objective lens 20 shown in FIG. 1. The raising mirror 21 reflects the laser beam reflected by the beam splitter 22 in the direction perpendicular to the record surface of the optical disc and into the objective lens 20. In addition, the raising mirror 21 reflects the laser beam reflected off of the optical disc back to the beam splitter 22.

The optical detector 25 receives the laser beam that is reflected off of the laser disc as it passes through the beam splitter 22 and outputs a voltage corresponding to the light intensity of the reflected laser beam.

The output voltage of the optical detector 25 is used for (1) a focus control for matching the distance between the objective lens 20 and the record surface of the optical disc 20 with the focal length of the objective lens 20, (2) a data process for reproducing data from the optical disc, and (3) a track control for matching the center of the laser beam that passes through the objective lens 20 with the center of the relevant track of the optical disc.

The second objective lens 30 is optically connected to a raising mirror 31 in the carriage body 10 and the fixed optical system 6. The fixed optical system 6 is composed of a Galvano mirror 32, an elliptical compensating prism 33, a λ/4 plate 34, a beam splitter 35, a collimate lens 36, a high power output laser device 37, a cylindrical lens 38, a beam splitter 39, an optical detector 40, a hologram plate 41, and an optical detector 42.

The collimate lens 36 collimates the laser beam emitted from the high power output laser device 37 and enters the collimated laser beam into the beam splitter 35.

The beam splitter 35 reflects the laser beam that passes through the collimate lens 36 and enters the collimated laser beam into the λ/4 plate 34. The beam splitter 35 also guides a laser beam reflected from the optical disc that passes through the λ/4 plate 34 into the cylindrical lens 38.

The λ/4 plate 34 varies the direction of polarized light of the laser beam emitted to the optical disc and the direction of polarized light of laser beam reflected from the optical disc by 90°.

The elliptical compensating prism 33 compensates the sectional shape of laser beam emitted to the optical disc into a circular shape. The elliptical compensating prism 33 has a surface 33a optically communicating with the high power output laser device 37. The surface 33a forms a reflecting surface that reflects part of a laser beam emitted to the Galvano mirror 32 so as to accomplish an auto power control (hereinafter referred to as APC) that monitors the fluctuation of the light intensity of the laser beam generated by the high power output laser device 37. The reflecting surface 33a is not perpendicular to the direction of the principal ray of the laser beam emitted to the Galvano mirror 32.

The Galvano mirror 32 reflects the laser beam emitted from the high power output laser device 37 into the raising mirror 31. In addition, to accomplish the track control, the Galvano mirror 32 slightly varies the angle of the laser beam emitted to the raising mirror 31.

The raising mirror 31 faces the rear surface of the second objective lens 30 shown in FIG. 1. The laser beam emitted from the high power output laser device 37 is reflected in the direction perpendicular to the record surface of the optical disc. The raising mirror 31 also reflects the laser beam reflected off of optical disc back to the Galvano mirror 32 which, in turn, reflects the beam through the elliptical compensating prism 33, the λ/4 plate 34, and the beam splitter 35, and the cylindrical lens 38.

The cylindrical lens 38 gives a predetermined focusing characteristic to the laser beam reflected back from the optical disc and enters the resultant laser beam into the beam splitter 39.

The beam splitter 39 divides the laser beam having the focusing characteristic given by the cylindrical lens 38 into two optical detectors 40 and 42.

The optical detector 40 receives the reflected laser beam from the second beam splitter 39 and outputs a voltage corresponding to the light intensity. The laser beam reflected by the reflecting surface 33a of the elliptical compensating prism 33 is also emitted to the optical detector 40 for the APC. The output voltage of the optical detector 40 is used for (1) the data process for reproducing data from the optical disc, (2) the track control for matching the center of the laser beam that passes through the second objective lens 30 with the center of a relevant track of the optical disc, and (3) the control for stabilizing an output signal of the high power output laser device 37.

The hologram plate 41 gives a predetermined optical characteristic to the laser beam reflected off of the optical disc emitted to the optical detector 42 so as to accurately detect the amount of out-of-focus.

The optical detector 42 receives the reflected laser beam to which a predetermined convergence characteristic is given by the hologram plate 41 and outputs a voltage corresponding to the light intensity of the reflected laser beam. The output voltage of the optical detector 42 is used for the focus control for matching the distance between the second object lens 30 and the record surface of the optical disc with the focal length of the objective lens 30.

Next, the structure of the control system of the optical head apparatus will be described.

Figure 2:
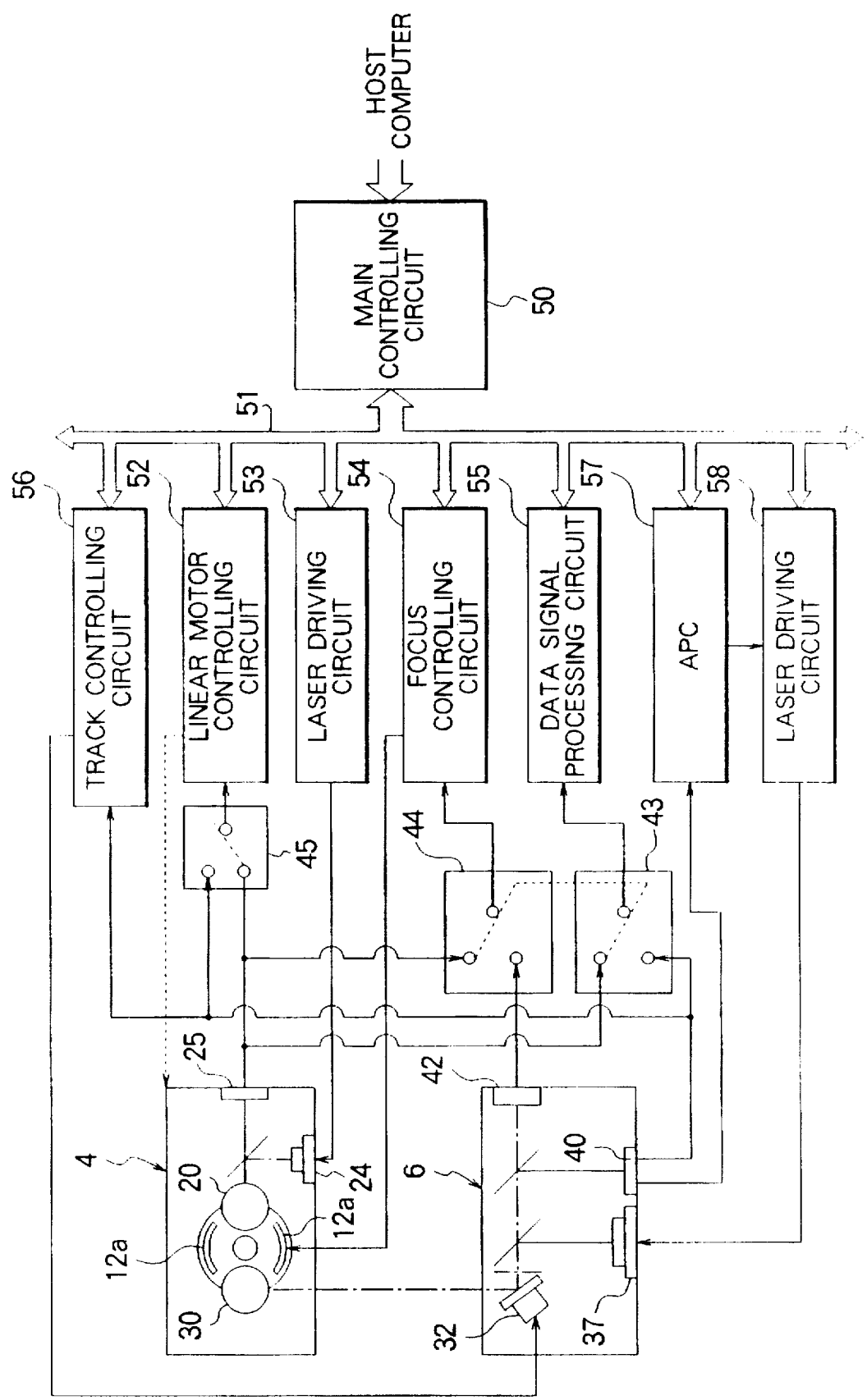
FIG. 2 is a block diagram showing the structure of a control system of the optical head apparatus shown in FIG. 1.

As shown in FIG. 2, the optical head apparatus 2 has a main controlling circuit 50 that reads data recorded on the optical disc corresponding to a command received from a host computer (not shown) and sends the data read from the optical disc to the host computer. An internal bus 51 is connected to the main controlling circuit 50. The internal bus 51 exchanges signals between various controlling circuits and processing circuits.

A linear motor controlling circuit 52, a laser driving circuit 53, a focus controlling circuit 54, a data signal processing circuit 55, a track controlling circuit 56, an APC 57, and a laser driving circuit 58 are connected to the internal bus 51.

The linear motor controlling circuit 52 supplies a predetermined current to a radial driving coil (not shown) of the carriage body 10 so as to move the carriage body 10 along the guide rails 8. The linear motor controlling circuit 52 causes the carriage body 10 to be moved in the vicinity of a designated track on the optical disc corresponding to a track deviation signal received from the optical detector 25 and the optical detector 40 selectively input through a selecting unit 45 and a position signal received from the main controlling circuit 50.

The laser driving circuit 53 drives the low power output laser device 24 so that it outputs a laser beam with a predetermined light intensity.

The focus controlling circuit 54 supplies driving currents to the driving coils 12a and 12a of the lens holder 12 corresponding to the out-of-focus signal, selectively input from the optical detector 25 or the optical detector 42 through the selecting unit 44, so that the laser beam that passes through the first objective lens 20 and the second objective lens 30 focuses on the record surface of the optical disc.

The data signal processing circuit 55 reproduces data recorded on the optical disc corresponding to an output voltage of the optical detector 25 or the optical detector 40 selectively input through the selecting unit 43.

The track controlling circuit 56 controls the reflecting angle of the laser beam of the Galvano mirror 32 corresponding to the output voltage of the optical detector 40 so that the deviation between the center of the laser beam that passes through the second objective lens 30 and the center of a relevant track of the optical disc is not more than a predetermined value.

The APC 57 monitors the light intensity of the laser beam generated by the high power output laser device 37 of the fixed optical system 6 corresponding to the output voltage of the optical detector 40 and controls the laser driving circuit 58 that drives the high power output laser device 37 so as to stabilize the output level of the high power output laser device 37.

Next, the operation of the optical head apparatus will be described.

When a power switch (not shown) is turned on, the main controlling circuit 50 reads an initial program from a memory (not shown) and places the lens holder 12 of the carriage body 10 to a predetermined position in a record region of the optical disc (for example, a calibration area of a read-in area).

Next, a disc identifying block (not shown) identifies the type of the optical disc that has been currently loaded and informs the host computer of the information. The disc identifying block may be a means for manually inputting the type of the optical disc.

When the host computer obtains the information of the type of the optical disc, it selects the low power optical system or the high power optical system corresponding to the type of the optical disc and informs the main controlling circuit 50 of the information of the selected optical system.

Next, the operation of the optical head apparatus in the case that an optical disc that has been loaded is a high density disc with a thickness of 0.6 mm or a multi-layered disc having layers with a thickness of 0.6 mm will be exemplified.

In this case, the main controlling circuit 50 controls the selecting unit 44 so that an output voltage of the optical detector 42 is input to the focus controlling circuit 54 and an output voltage of the optical detector 40 is input to the data signal processing circuit 55.

Next, the main controlling circuit 50 activates the laser driving circuit 58 so as to preliminarily generate laser light of the high power output laser device 37 (namely, start reproducing data from the laser disc). The light intensity of laser beam preliminarily generated by the high power output laser device 37 is the same as the light intensity of which data is reproduced from the laser disc.

The laser beam generated from the high power output laser device 37 is converted into a collimated laser beam by the collimate lens 36. The collimated laser beam is in parallel with the optical axis. The collimated laser beam is reflected by the beam splitter 35 and then entered into the λ/4 plate 34.

The λ/4 plate 34 changes the polarizing direction of the laser beam by 90°. Thereafter, the elliptical compensating prism 33 compensates the beam spot of the laser light in a circular shape. The resultant laser light is guided to the Galvano mirror 32. Part of the resultant laser beam is reflected off of the reflecting surface 33a of the elliptical compensating prism 33 and then entered into the optical detector 40 so as to monitor the light intensity of the laser beam.

The laser beam that passes through the elliptical compensating prism 33 is guided to the second objective lens 30 of the lens holder 12 by the Galvano mirror 32 and the raising mirror 31. The laser beam that passes through the second objective lens 30 is radiated to the record surface of the optical disc. The laser beam is reflected off of the record surface and returned to the second objective lens 30.

The reflected laser beam returned to the second objective lens 30 is returned to the beam splitter 35 by the raising mirror 31, the Galvano mirror 32, the elliptical compensating prism 33, and the λ/4 plate 34. In addition, the reflected laser beam is emitted to the cylindrical lens 38 through the beam splitter 35. The cylindrical lens 38 gives a predetermined focusing characteristic to the laser beam. The resultant laser beam then enters into the beam splitter 39.

The reflected laser beam entered into the beam splitter 39 is divided into two reflected laser beams with nearly the same light intensity. The divided laser beams are entered into the optical detectors 40 and 42. The hologram plate 41 gives the predetermined optical characteristic to the laser beam emitted to the optical detector 42 so as to accurately detect the out-of-focus.

Thereafter, the track controlling circuit 56 adjusts the angle of the Galvano mirror 32 corresponding to the output voltage of the optical detector 40 so that the center of the laser beam that passes through the second objective lens 30 matches the center of a particular track of the optical disc.

Then, the focus controlling circuit 54 supplies driving currents to the driving coils 12a and 12a to move lens holder 12 so that the laser beam that passes through the second objective lens 30 focuses on the record surface of the optical disc.

Next, the data signal processing circuit 55 reproduces data from the output voltage of the optical detector 40. The reproduced data is sent to the host computer through the main controlling circuit 50.

Next, the operation of the optical head apparatus according to the present invention in the case that an optical disc that has been loaded in the apparatus is a conventional disc with a thickness of 1.2 mm will be described.

The main controlling circuit 50 controls the selecting units 44 and 43 so that the output voltage of the optical detector 25 is input to the focus controlling circuit 54 and the data signal processing circuit 55.

Next, the main controlling circuit 50 activates the laser driving circuit 53 so as to start generating a preliminary laser beam of the low power output laser device 24. In this state, the low power output laser device 24 generates a laser beam with a predetermined light intensity.

The laser beam generated by the lower power output laser device 24 is converted into a predetermined shape by the hologram plate 23. The resultant laser beam enters into the first objective lens 20 through the beam splitter 22 and the raising mirror 21. The laser beam that passes through the first objective lens 30 is radiated to the record surface of the optical disc. The laser beam is then reflected off of the record surface and returned to the first objective lens 20.

The reflected laser beam returned to the first objective lens 20 is emitted to the optical detector 25 through the raising mirror 21 and the beam splitter 22.

Thereafter, the linear motor controlling circuit 52 controls currents supplied to the radial driving coils of the carriage body 10 corresponding to the output voltage of the optical detector 25 so that the center of the laser beam that passes through the first objective lens 20 matches the center of a relevant track of the optical disc.

Next, the focus controlling circuit 54 supplies driving currents to the driving coils 12a and 12a of the lens holder 12 corresponding to the out-of-focus signal that is output from the optical detector 25 so that the laser beam that passes through the first object lens 20 focuses on the record surface of the optical disc.

Thereafter, the data signal processing circuit 55 reproduces data from the output voltage of the optical detector 25. The reproduced data is sent to the host computer through the main controlling circuit 50.

As described above, according to the optical head apparatus, the first optical system having the first objective lens 20 and the low power output laser device 24 or the second optical system having the second objective lens 30 and the high power output laser device 37 can be selected corresponding to the type of an optical disc for use. Thus, the energy use efficiency of the laser beam can be improved in comparison with that of an apparatus with a multi-focus lens. Consequently, without need to use a light source having a high light intensity, data of various types of optical discs with different record densities can be accurately reproduced. In addition, data can be more accurately and rapidly recorded on various optical discs with different record densities.

Next, an optical head apparatus according to a modification of the present invention will be described.

Figure 3:
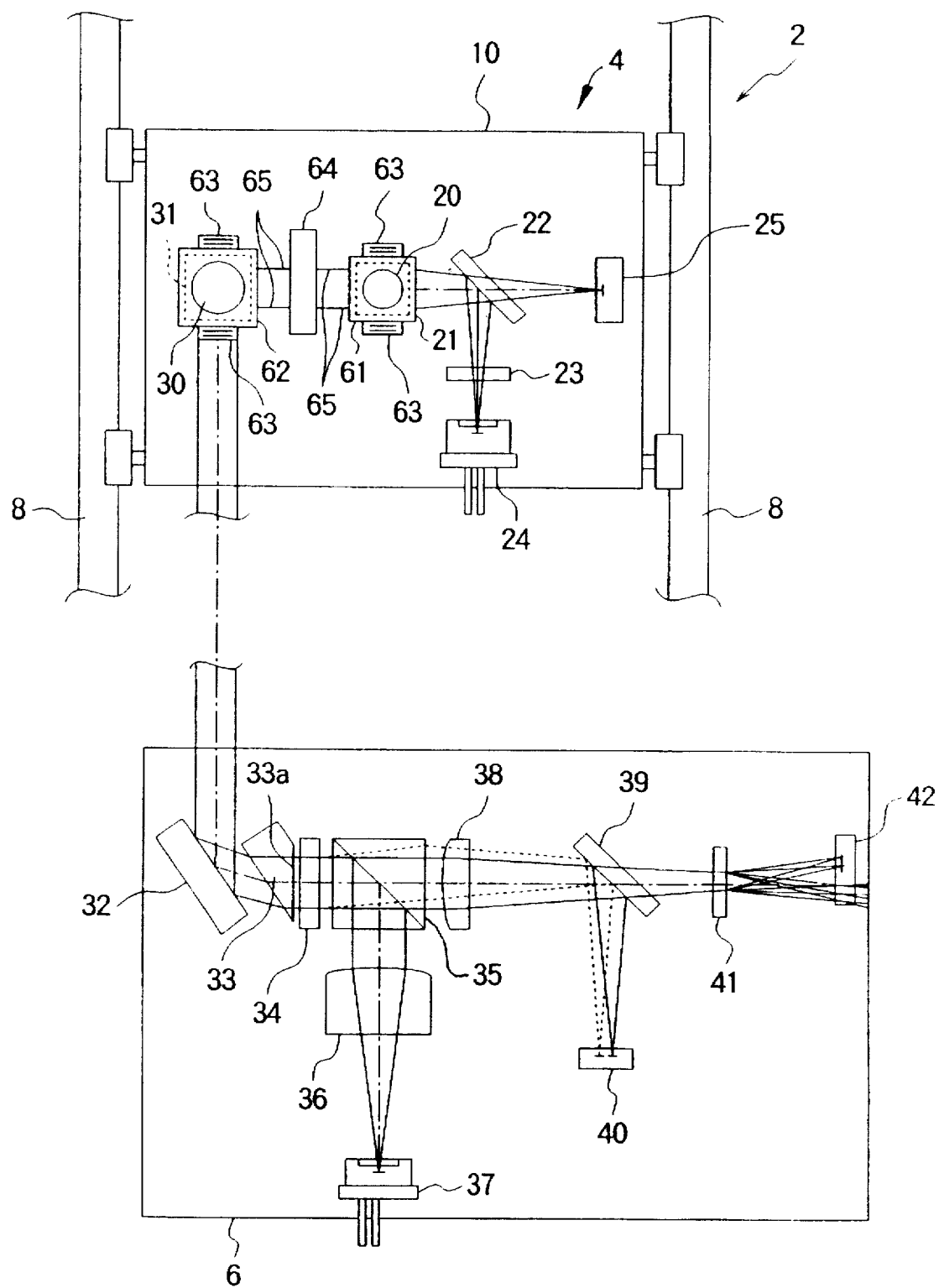
FIG. 3 is a schematic diagram showing the structure of a modification of the optical head apparatus shown in FIG. 1.

FIG. 3 shows the structure of the optical head apparatus. As a feature of the optical head apparatus 2, a carriage body 10 has lens holders 61 and 62 that hold a first objective lens 20 and a second objective lens 30, respectively. Each of the lens holders 61 and 62 has an independent magnetic circuit composed of driving coils 63 and 63 and magnets (not shown) that perform a focus control.

The lens holders 61 and 62 are supported on a fixing wall 64 of the carriage body 10 through two wire springs 65 in such a manner that the lens holders 61 and 62 are movable in the direction perpendicular to the record surface of the optical disc.

As with the optical head apparatus shown in FIG. 1, the first objective lens 20 held by the first lens holder 61 is connected to a raising mirror 21, a beam splitter 22, a hologram plate 23, a low power output laser device 24, and an optical detector 25 that are disposed in the carriage body 10.

As with the optical head apparatus as shown in FIG. 1, the second objective lens 21 held by the second lens holder 62 is optically connected to a raising mirror 31 in the carriage body 10 and a fixed optical system 6 that is composed of a Galvano mirror 32, an elliptical compensating prism 33, a λ/4 plate 34, a beam splitter 35, a collimate lens 36, a high power output laser device 37, a cylindrical lens 38, a beam splitter 39, an optical detector 40, a hologram plate 41, and an optical detector 42.

The operation of the controlling system of the optical head apparatus 2 shown in FIG. 3 is the same as that of the optical head apparatus shown in FIG. 1 except that driving currents for focus controls are individually supplied to the driving coils 63 and 63 of the lens holders 61 and 62.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical head apparatus comprising:
   a movable optical system movable radially with respect to a recording medium, the movable optical system comprising:

a first light source, a first lens having a first focal length configured to focus light radiated by the first light source on a recording surface of the recording medium, a second lens having a second focal length, a first photoelectric converting device constructed and arranged to receive the light radiated from the first light source after the light reflects off of the recording surface of the recording medium and convert the light into an electric signal, and a lens holder having the first lens and the second lens mounted thereon, the lens holder being constructed and arranged to be moved in a focusing direction; a fixed optical system comprising:

a second light source, the second lens being configured to focus light radiated by the second light source on the record surface of the record medium, and a second photoelectric converting device constructed and arranged to receive the light radiated from the second light source after the light reflects off the recording surface of the recording medium and convert the light to an electric signal; and a selecting device configured to select a first optical arrangement or a second optical arrangement, the first optical arrangement comprising the first light source, the first lens, and the first photoelectric converting device, the second optical arrangement comprising the second light source, the second lens, and the second photoelectric converting device.

2. The optical head apparatus as set forth in claim 1, wherein the selecting device automatically selects the first optical arrangement or the second optical arrangement corresponding to the type of recording medium.

3. An optical head apparatus as set forth in claim 1 wherein:

the first light source radiates light with a first intensity, and the second light source radiates light with a second intensity, the second intensity being different from the first intensity.

4. The optical head apparatus as set forth in claim 1, further comprising:

a controller constructed and arranged to control the position of the lens holder corresponding to signals received from the first photoelectric converting device or the second photoelectric converting device such that focusing of light by the lens of a selected one of the optical arrangements is adjusted so that the light focuses on the center of a relevant track on the recording surface of the recording medium, the selected one of the optical arrangements being selected by the selecting device.

5. The optical head apparatus as set forth in claim 1, further comprising:

a controller constructed and arranged to control the position of the lens holder corresponding to signals received from the first photoelectric converting device or the second photoelectric converting device such that focusing of light by the lens of a selected one of the optical arrangements is adjusted so that the light focuses on the recording surface of the recording medium, the selected one of the optical arrangements being selected by the selecting device.

6. An optical head apparatus comprising:

a movable optical system movable radially with respect to a recording medium, the movable optical system comprising:

a first light source, a first lens having a first focal length configured to focus light radiated by the first light source on a recording surface of the recording medium, a second lens having a second focal length, a first photoelectric converting device constructed and arranged to receive the light radiated from the first light source after the light reflects off of the recording surface of the recording medium and convert the light into an electric signal, a first lens holder having the first lens mounted thereon, the first lens holder being constructed and arranged to be moved in a focusing direction, and a second lens holder having the second lens mounted thereon, the second lens holder being constructed and arranged to be moved in a focusing direction; a fixed optical system comprising:

a second light source, the second lens being configured to focus light radiated by the second light source on the record surface of the record medium, and a second photoelectric converting device constructed and arranged to receive the light radiated from the second light source after the light reflects off the recording surface of the recording medium and convert the light into an electric signal; and a selecting device configured to select a first optical arrangement or a second optical arrangement, the first optical arrangement comprising the first light source, the first lens, and the first photoelectric converting device, the second optical arrangement comprising the second light source, the second lens, and the second photoelectric converting device.

* * * * *

UNITED STATES PATENT AND TRADEMARK OFFICE
CERTIFICATE OF CORRECTION

PATENT NO. : 5,781,519
DATED : July 14, 1998
INVENTOR(S) : ISHIKA, et al

It is certified that error appears in the above-identified patent and that said Letters Patent is hereby corrected as shown below:

Column 1, line 8 reads: "disc apparatus"

Should read: --head apparatus--

Column 1, line 10 reads: "head"

Should read: --disc--

Signed and Sealed this

Second Day of February, 1999

Attest:

Attesting Officer

*Acting Commissioner of Patents and Trademarks*